United States Patent
Kauffman et al.

(10) Patent No.: US 11,904,753 B2
(45) Date of Patent: Feb. 20, 2024

(54) ADJUSTABLE DECK SYSTEM FOR CARGO COMPARTMENT

(71) Applicant: Ancra International LLC, Azusa, CA (US)

(72) Inventors: Gregory Alan Kauffman, Cincinnati, OH (US); Jerome Thomas Jones, Independence, KY (US); Matthew James Rommel, Independence, KY (US)

(73) Assignee: ANCRA INTERNATIONAL, LLC, Hebron, KY (US)

( * ) Notice: Subject to any disclaimer, the term of this patent is extended or adjusted under 35 U.S.C. 154(b) by 0 days.

(21) Appl. No.: 17/696,026

(22) Filed: Mar. 16, 2022

(65) Prior Publication Data
US 2022/0297587 A1    Sep. 22, 2022

Related U.S. Application Data

(60) Provisional application No. 63/161,641, filed on Mar. 16, 2021.

(51) Int. Cl.
*B60P 1/43* (2006.01)
*B60P 3/08* (2006.01)
*B60P 3/00* (2006.01)

(52) U.S. Cl.
CPC ............ *B60P 1/433* (2013.01); *B60P 1/435* (2013.01); *B60P 3/00* (2013.01); *B60P 3/08* (2013.01)

(58) Field of Classification Search
CPC .. B60P 1/433; B60P 1/435; B60P 3/07; B60P 3/08; B60P 3/122; B60P 3/12
See application file for complete search history.

(56) References Cited

U.S. PATENT DOCUMENTS

| | | | |
|---|---|---|---|
| 2,137,981 A | 11/1938 | Nightingale | |
| 2,251,358 A | 8/1941 | Judd et al. | |
| 2,424,862 A | 7/1947 | Stuart | |
| 2,461,927 A | 2/1949 | Schaldach et al. | |
| 4,701,086 A * | 10/1987 | Thorndyke | B60P 1/02 296/24.45 |
| 4,786,222 A * | 11/1988 | Blodgett | B60P 3/08 410/29 |
| 4,801,229 A * | 1/1989 | Hanada | B60P 3/08 410/26 |
| 4,966,510 A * | 10/1990 | Johnson, Jr. | B60P 3/08 410/24 |
| 5,106,246 A | 4/1992 | Chance | |
| 5,527,138 A | 6/1996 | Flores et al. | |

(Continued)

OTHER PUBLICATIONS

Office Action received for Canadian Patent Application No. 3152409, dated Oct. 6, 2023, 4 pages.

*Primary Examiner* — Kaitlin S Joerger
(74) *Attorney, Agent, or Firm* — Shook, Hardy & Bacon L.L.P.

(57) ABSTRACT

A deck system for cargo compartment may including one or more of the following features: a first deck; a second deck, where at least one of the first deck and the second deck divide the cargo compartment into an upper sub-compartment and a lower sub-compartment; and an actuator that is mechanically coupled to the second deck, where operation of the actuator causes at least a portion of the second deck to move vertically relative to the first deck within the cargo compartment.

20 Claims, 17 Drawing Sheets

(56) References Cited

U.S. PATENT DOCUMENTS

| | | | | |
|---|---|---|---|---|
| 5,730,578 | A * | 3/1998 | Smidler | B60P 3/08 |
| | | | | 410/24 |
| 6,283,040 | B1 * | 9/2001 | Lewin | B61D 3/18 |
| | | | | 105/393 |
| 6,368,034 | B1 * | 4/2002 | Frye | B60P 3/08 |
| | | | | 410/24 |
| 6,382,358 | B1 | 5/2002 | Kritzer | |
| 6,524,055 | B1 | 2/2003 | Overbye | |
| 7,625,163 | B2 | 12/2009 | Kuenzli | |
| 7,665,788 | B2 * | 2/2010 | Dibdin | B60P 1/02 |
| | | | | 296/25 |
| 8,123,282 | B1 * | 2/2012 | Miller | B60P 1/02 |
| | | | | 296/181.3 |
| 9,776,547 | B2 | 10/2017 | Lin | |
| 10,800,311 | B2 | 10/2020 | Roth et al. | |
| 2003/0035695 | A1 * | 2/2003 | Blackmon | B60P 3/08 |
| | | | | 410/26 |
| 2018/0118408 | A1 * | 5/2018 | Bradley | B65D 88/129 |
| 2019/0291628 | A1 | 9/2019 | Cerocchi | |
| 2021/0070592 | A1 * | 3/2021 | Schwartz | B60P 3/08 |

* cited by examiner

ADJUSTABLE DECK SYSTEM FOR CARGO COMPARTMENT

RELATED APPLICATION

This application claims the benefit of U.S. Provisional Application No. 63/161,641, filed Mar. 16, 2021, which is hereby incorporated by reference in its entirety.

TECHNICAL FIELD

This disclosure relates to decking systems for use in supporting freight in a vehicle compartment along with methods for using the same.

BACKGROUND

In vehicles employed for handling freight, such as trucks, aircraft and railroad cars, it is often desirable to provide beams, decks, or shelves to support various cargo items. For example, truck trailers may include a cargo compartment for hauling various cargo, and it may be desirable to include a deck within the cargo compartment to increase the storage capacity for various cargo types. The present disclosure relates to improved decks and deck systems that can be moved or otherwise adjusted to manipulate the size of sub-compartments within the cargo compartment, assist with loading, and perform various other functions.

BRIEF DESCRIPTION OF THE DRAWINGS

Certain features, aspects, and advantages of the disclosed embodiments are shown in the drawings accompanying this description. The drawings are briefly described below.

DETAILED DESCRIPTION

Figure 1:
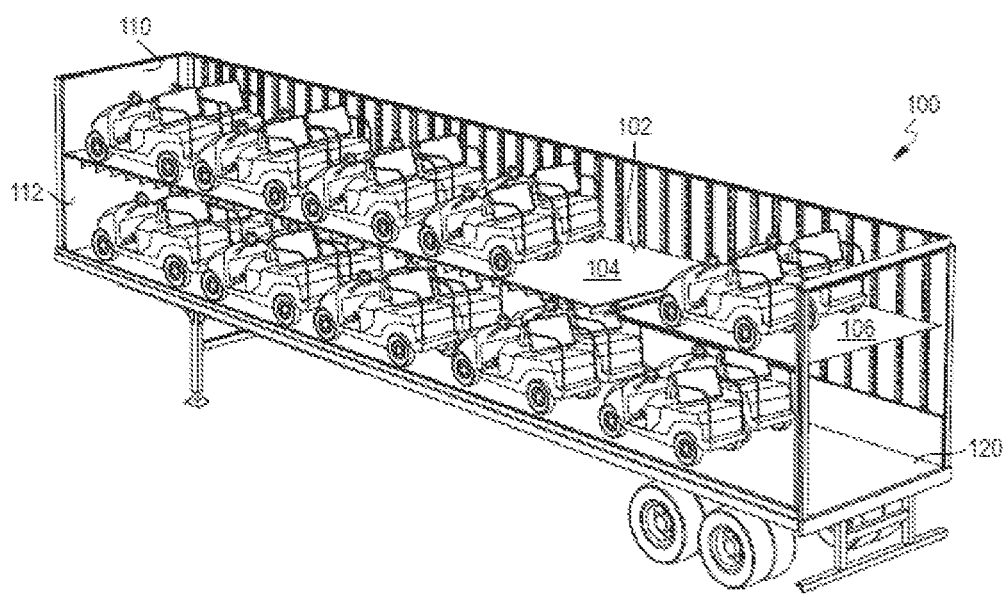
FIG. 1 is an illustration showing a cargo trailer having an adjustable deck system having a first deck and a second deck in accordance with certain aspects of the present disclosure.

The present embodiments are described with reference to the drawings in which like elements are referred to by like numerals. The relationship and functioning of the various elements of this invention are better understood from the following detailed description. However, the embodiments of the invention are not limited to the embodiments illustrated in the drawings. It should be understood that in certain instances, details have been omitted which are not necessary for an understanding of the present invention, such as conventional fabrication and assembly.

FIG. 1 shows an adjustable deck system 102 for a cargo trailer 100. The adjustable deck system 102 includes a first deck 104 and a second deck 106 located inside a cargo compartment 108 of the trailer 100. The first deck 104 and the second deck 106 may selectively compartmentalize the trailer 100 to increase the overall capacity of the cargo compartment 108. For example, the adjustable deck system 102 divides the cargo compartment 108 into an upper sub-compartment 110 and a lower sub-compartment 112, where the bottom of the upper sub-compartment 110 may be defined by upper surfaces of the first deck 104 and the second deck 106, respectively. In FIG. 1, the first deck 104 and the second deck 106 are about half-way between a floor 120 and a ceiling (not shown) of the cargo compartment 108 such that the upper sub-compartment 110 and the lower sub-compartment 112 are approximately the same size.

However, the first deck 104 and the second deck 106 may be movable vertically, as needed, which will alter the size of the sub-compartments.

Figure 2:
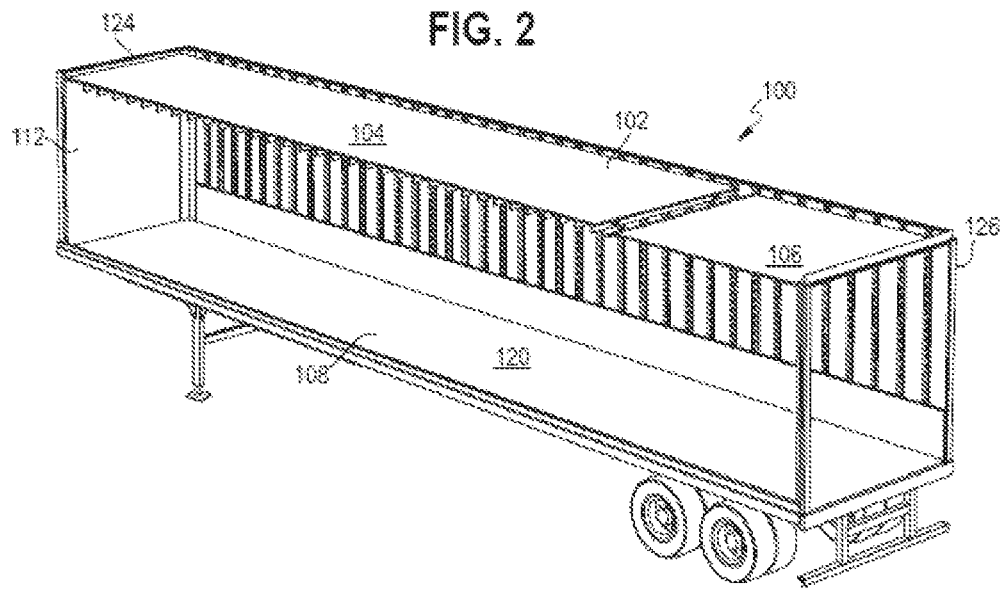
FIG. 2 is an illustration showing the deck system of FIG. 1 in a configuration where a lower sub-compartment of the cargo trailer has a maximum volume in accordance with certain aspects of the present disclosure.

The sizes of the sub-compartments may be adjusted by moving the first deck 104 and/or the second deck 106 vertically. As shown in FIG. 2, the first deck 104 and the second deck 106 are located adjacent to the ceiling (not shown) of the trailer 100, thereby maximizing the volume of the lower sub-compartment 112. The first deck 104 and the second deck 106 may be movable to any suitable location between the ceiling (not shown) and the floor 120, as desired. While not shown, it is contemplated that the first deck 104 may move vertically independently from the second deck 106, and vice versa, which may provide the ability to compartmentalize the front 124 of the trailer 100 differently from the rear 126 of the trailer 100.

While one adjustable deck system is shown, it is contemplated that the trailer 100 could include two or more adjustable deck systems (vertically stacked) for further compartmentalizing the trailer 100. For example, if more than two sub-compartments are desired, two or more adjustable deck systems may be included.

Figure 3:
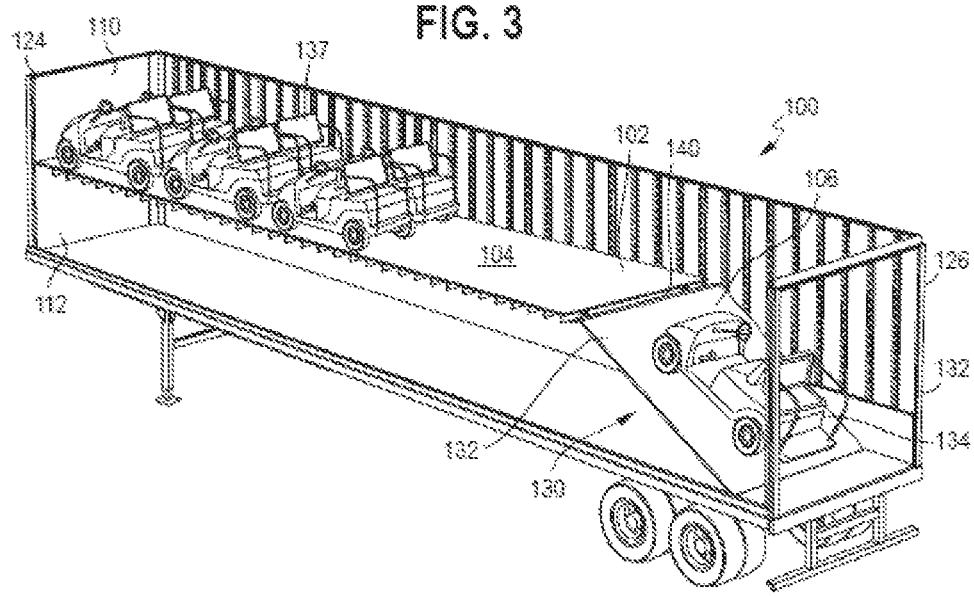
FIG. 3 is an illustration showing the deck system of FIG. 1 in a configuration where a ramp is formed in accordance with certain aspects of the present disclosure.
Figure 4:
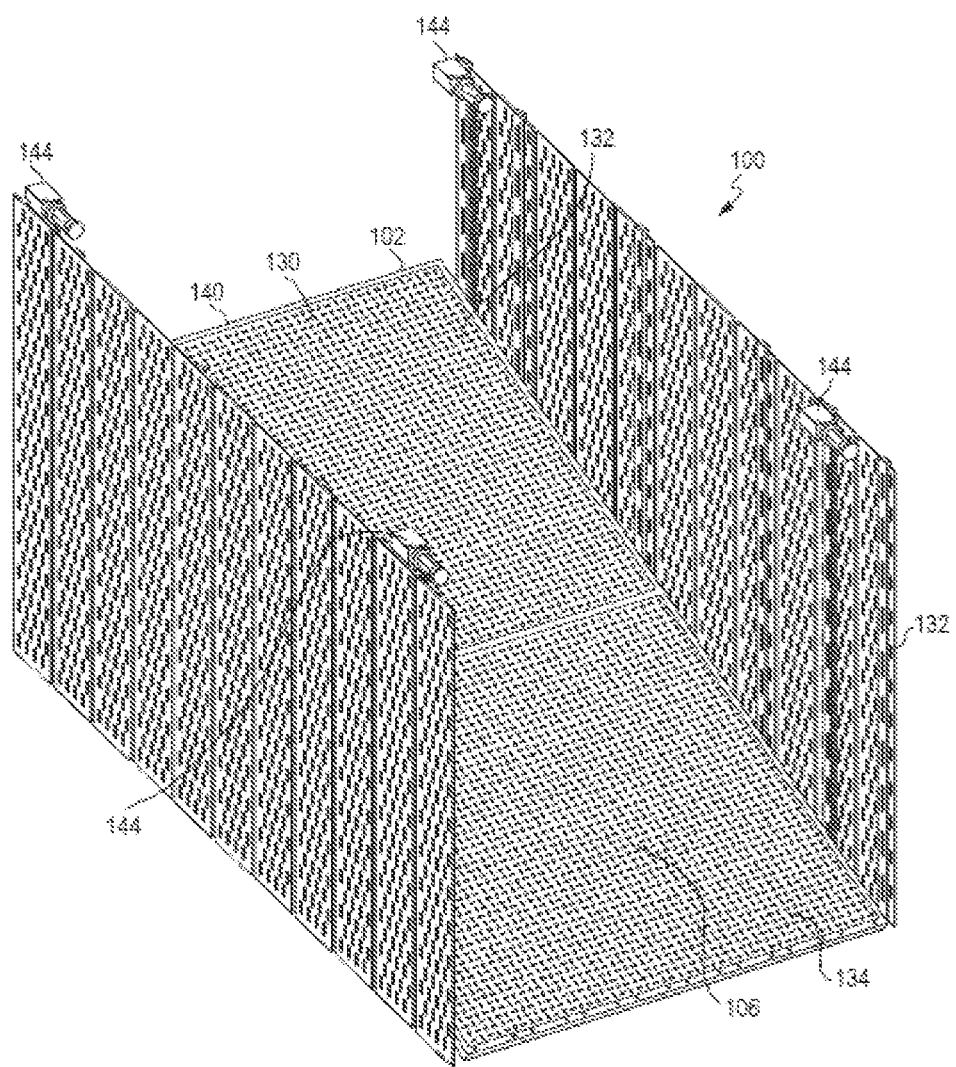
FIG. 4 is an illustration showing additional details of the ramp from FIG. 3, including actuators for moving the ramp in accordance with certain aspects of the present disclosure.

At least one deck of the adjustable deck system 102 may be rotatable to form a ramp. For example, FIGS. 3-4 show the second deck 106 forming a ramp 130. The ramp 130 in the depicted embodiment extends from a junction 140 adjacent to the first deck 104 towards a door 132 at the rear 126 of the trailer 100. Thus, a first end 134 of the second deck 106 may be adjacent to the first deck 104 and a second end 136 of the second deck 106 may be adjacent to the door 132. As discussed in more detail below, a pivot or rotational point, which may be the center of the rotation of the second deck 106, may be located at the junction 140. In other embodiments, the center of rotation of the second deck 106 may be in another location. Also, while not shown herein, it is contemplated that the first deck 104 may be rotatable to form a separate ramp (e.g., extending downward towards the front 124 of the trailer 100).

Advantageously, the access to the upper sub-compartment 110 provided by the ramp 130 may allow for easy and efficient loading of the upper sub-compartment 110. In the instance of loading powersport vehicles 137 (e.g., golf carts, side-by-side off road vehicles, four-wheelers, motorcycles, etc.) as shown in the present example, the vehicles 137 may be wheeled through the door 132 and directly up the ramp 130. Once loading of the upper sub-compartment 110 is complete (perhaps with cargo still on the ramp 130), the second deck 106 may be manipulated into a horizontal orientation shown in FIG. 1, thereby providing access from the door 132 to the lower compartment 112 beneath the second deck 106. The deck system 102 may be altered in a suitable way to accommodate cargo of other types, if needed. The deck 106 being manipulated with cargo placed thereon may be advantageous for maximizing the usage of space within the upper sub-compartment 110, for example, since such cargo may be located on the second deck 106 along with the deck 104. Thus, in one example, the powersport vehicles 137 may be loaded until the deck 104 is full, followed by driving additional powersport vehicles 137 onto the ramp. Then, the second deck 106 may be moved into a horizontal position aligned with the first deck 104 with these additional powersport vehicles 137 still located on the second deck 106, thereby utilizing all of the floor space of the upper sub-compartment 110.

Figure 5:
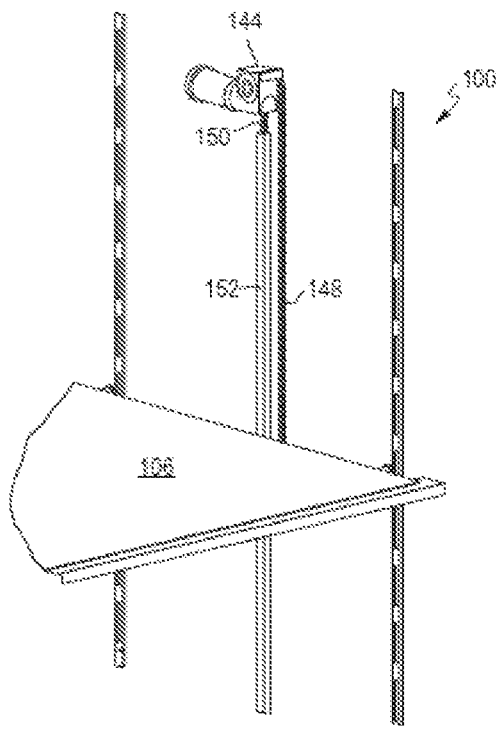
FIG. 5 is an illustration showing additional details of an actuator for moving the ramp of FIG. 3, where the actuator includes a chain drive in accordance with certain aspects of the present disclosure.

As shown in FIG. 4, the height of the second deck 106 in the trailer 100, and/or the slope of the second deck 106, may be controlled by one or more actuators 144. As shown, the actuators 144 may be chain drives, but any other suitable actuator is also contemplated (e.g., a belt drive, hydraulic lift, linear actuator or other elevator system, etc.). In the depicted embodiment, four chain drives are included (one for controlling each corner of the second deck 106), which may be advantageous since a variety of slopes or other orientations of the second deck 106 are possible. For example, by lowering the rear chain drives, the second deck 106 may move from a horizontal position (e.g., shown in FIG. 1) to a ramped position (shown in FIGS. 3-4). Raising all four of the chain drives may cause the entirety of the second deck 106 to move vertically, thereby moving the second deck 106 in to the position as shown in FIG. 2, for example. While not shown, the first deck 104 may be controlled in a similar fashion. Notably, a control system may be electrically connected to each of the actuators 144 programmed to operate the actuators 144 in unison to accomplish a particular function (e.g., to form the ramp 130). As an alternative, only two of the actuators 144 may operate in unison (e.g., the rear actuators), and/or each actuator 144 may be operated manually (via individual buttons, for example). FIG. 5 shows additional details of the actuator 144. As shown, the chain drive may include a chain 146 having a single leg 148 that extends to the second deck 106. A second leg 150 of the chain 146 may be located within a housing 152, for example, thereby preventing it from remaining loose within the trailer 100. The chain drive may include a rotatable sprocket for moving the chain 146, for example, which may lengthen or shorten the single leg 148 (e.g., to raise or lower the corresponding edge of the second deck 106).

Figure 6:
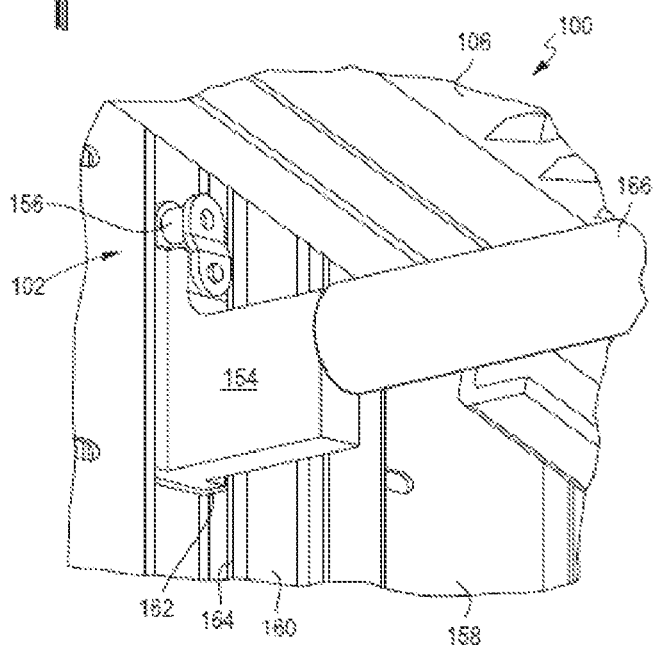
FIG. 6 is an illustration showing a sliding foot that moves with a deck of the deck system upon actuation of the chain drive of FIG. 5 in accordance with certain aspects of the present disclosure.

Referring to FIG. 6, a sliding foot 154 may be coupled to an end of the chain 146 from FIG. 5 (which is not shown in FIG. 6). E.g., an eye 156 fixed to the sliding foot 154 may directly engage a link of the chain. The sliding foot 154 may provide a connection between the second deck 106 and a wall 158 of the trailer 100. For example, a track 160 may be fixed to the wall 158 and sized to receive the sliding foot 154. In the depicted embodiment, two outwardly-extending protrusions 162 of the sliding foot 154 are located within vertical-extending grooves 164 defined by the track 160. While any suitable material is contemplated, in some embodiments, at least a portion of the sliding foot 154 (such as at least the protrusions 162) may include a Delrin® plastic material or other material that reduces friction to provide a smooth and consistent sliding motion of the sliding foot 154. Additionally or alternatively, a lubrication may be applied to facilitate sliding. Advantageously, the sliding foot 154 may be prevented from rotation or horizontal movement but allowed to slide vertically along the track 160 under the control of the chain drive described above.

In the depicted embodiment, a first horizontal support 166, which in this case is a roller bar or roller tube, extends from the sliding foot 154 and provides vertical support for the second deck 106. Optionally, the first horizontal support 166 may directly connect to the sliding foot 154 (i.e., via direct contact). An opposite end of the first horizontal support 166 may be coupled to a separate sliding foot on the opposite wall of the trailer 100, for example. During adjustment of the deck system 102, the sliding foot 154 may control the vertical position of the first horizontal support 166. That is, when the sliding foot 154 moves vertically, the first horizontal support 166 also moves vertically causing movement of the second deck 106. Typically, the longitudinal axis of the first horizontal support 166 will remain horizontal throughout its movement, but this is not required in all circumstances.

Optionally, the first horizontal support 166 may be rotatable relative to the sliding foot 154 about its longitudinal axis, which may be particularly advantageous when the first horizontal support 166 is fixed relative to the underside of the second deck 106. In other embodiments, the first horizontal support 166 may be substantially or completely fixed relative to the sliding foot 154 (e.g., where the second deck 106 may be rotatable/slideable relative to the first horizontal support 166).

Figure 7:
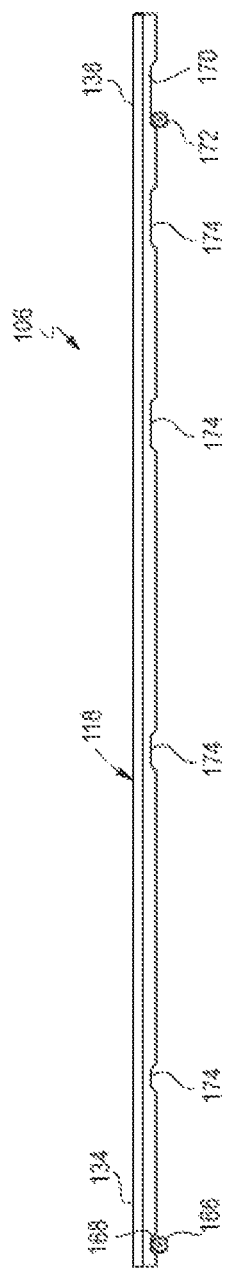
FIG. 7 is an illustration showing a side view of the second deck from FIG. 1, where the second deck has slots of varying sizes in accordance with certain aspects of the present disclosure.

FIG. 7 shows a side view of the second deck 106. Referring to FIGS. 6-7, the second deck 106 includes a number of slots for receiving horizontal supports that extend from one wall of the trailer 100 to another. One example of such a horizontal support is the first horizontal support 166 of FIG. 6, for example. In particular, the first horizontal support 166 of FIG. 6 may generally fit within a first slot 168 of FIG. 7, particularly located at the first end 134 of the second deck 106, which (as discussed above) may be located adjacent to a pivot point of the second deck 106. The inner diameter of the first slot 168 may be substantially the same size as the outer diameter of the first horizontal support 166 such that horizontal (and vertical) displacement is prevented between the second deck 106 and the first horizontal support 166.

A second slot 170 may be located at the second end 136 of the second deck 106, which may be located closest to a trailer door. The second slot 170 may receive a second horizontal support 172 for providing vertical support of the second end 136. In contrast to the first slot 168, the second slot 170 may be defined by a cutout that is substantially larger than a cross-sectional dimension of the second horizontal support 172. Thus, the second horizontal support 172 may be capable of sliding within the second slot 170 in a direction parallel to a plane defined by the top surface 118 of the second deck 106.

Figure 8:
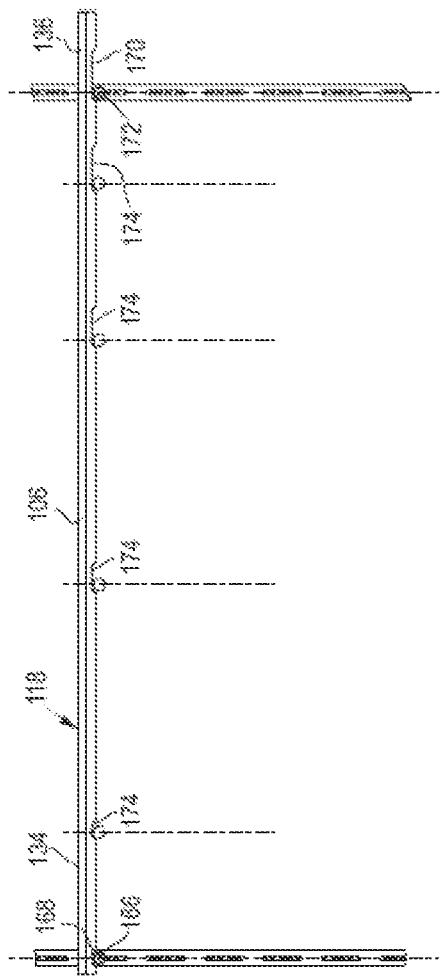
FIGS. 8A-8B are illustrations showing the second deck of FIG. 7 in horizontal and ramped configurations, respectively, in accordance with certain aspects of the present disclosure.

FIGS. 8A-8B illustrate an advantage of having the first slot 168 being different in size in relation to the second slot 170. As shown in FIG. 8A, when the second deck 106 is in a horizontal orientation, the first horizontal support (in this case the first horizontal support 166) is located within the first slot 168 and the second horizontal support 172 is located within the second slot 170. Since the two horizontal supports are at the same height, the top surface 118 of the second deck 106 is substantially horizontal, or parallel with the floor of the trailer. The second horizontal support 172 is located near a first end 134 of the second slot 170 (which is the closest end to the first slot 168).

By contrast, the first horizontal support 166 and the second horizontal support 172 are offset vertically when the second deck 106 forms a ramp, as shown in FIG. 8B. Assuming the vertical tracks of the trailer wall are parallel, the first horizontal support 166 and the second horizontal support 172 remain the same distance from each other in the horizontal direction (as defined by the trailer floor). Thus, the true distance between the first horizontal support 166 and the second horizontal support 172 increases as the second deck 106 rotates from its horizontal orientation of FIG. 8A. The length of the second slot 170 accounts for this change in distance by providing room for the second horizontal support 172 to slide relative to the second deck 106. In FIG. 8B, for example, the second horizontal support 172 is located at a second end 136 of the second slot 170. The length of the second slot 170 may be optimized such that the second horizontal support 170 reaches the second end 136 of the second slot 170 when the second deck 106 reaches its maximum ramped angle.

Additional slots in the second deck 106 may be included with varying lengths, as appropriate. For example, referring back to FIG. 7, intervening slots 174 are located between the first slot 168 and the second slot 170, and these intervening slots 174 may each receive a horizontal support to further support the second deck 106. The intervening slots 174 may sequentially increase in size such that their respective lengths are proportional to the displacement experienced between the second deck 106 and each respective horizontal support as the second deck 106 rotates towards its ramped orientation. Any suitable number of slots may be included.

Figure 9:
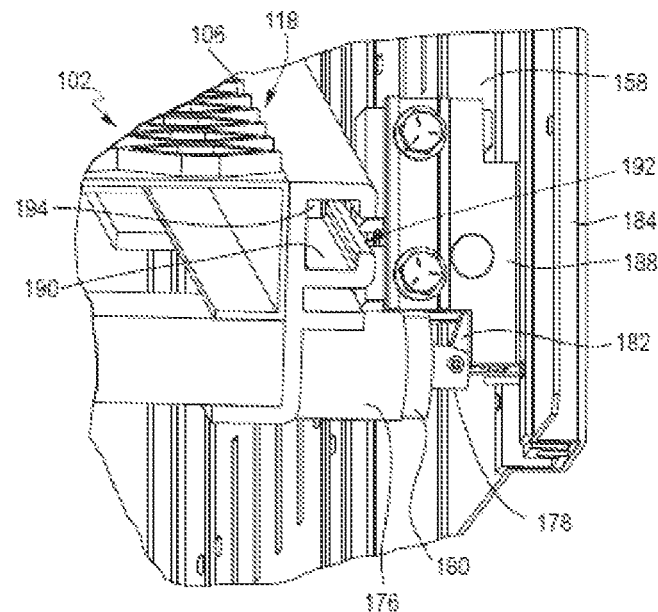
FIG. 9 is an illustration showing a fastening feature that includes a solenoid for locking the second deck of the deck system in place in accordance with certain aspects of the present disclosure.
Figure 10:
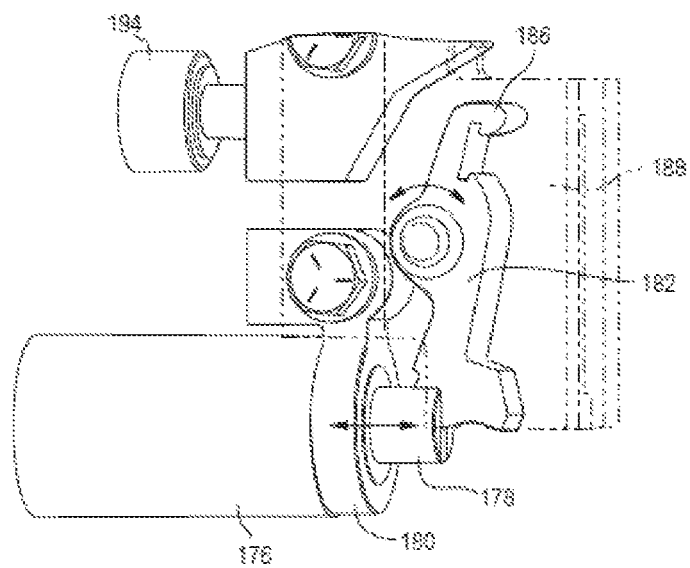
FIG. 10 is an illustration showing additional details of the solenoid of FIG. 9 along with a corresponding latch and sliding head in accordance with certain aspects of the present disclosure.

Optionally, the deck system 102 may include one or more fastening device to fix one or more decks in place. Without limitation, one such fastening device may be a solenoid 176 coupled to a deck (in this case the second deck 106) as shown in FIGS. 9-10. For example, the solenoid 176 may include a linear actuator 178 that extends or contracts relative to a solenoid body 180 to engage or disengage a latch 182. In the depicted embodiment, the solenoid 176 may cause the latch to move into a locking position absent a control signal provided to the solenoid 176 (e.g., in a default state), which may be advantageous to ensure the second deck 106 does not fall if the solenoid 176 loses power or is otherwise not electrically activated. Upon receipt of the control signal, the linear actuator 178 may extend outward, thereby moving the latch 182 into a disengaged position and allowing the second deck 106 to move. While not shown, the latch 182 may be associated with a plurality of slots within a vertical track 184 such that a latch finger 186 enters and hooks within these slots when in the locking position.

The solenoid 176 may be coupled (e.g., fixed) to a bracket 188 that is slideable within the vertical track 184 of the wall 158 (e.g., in a manner similar to the sliding foot 154 discussed above). Thus, as the second deck 106 moves vertically, the solenoid 176 can move vertically along with it. Optionally, it is contemplated that the bracket 188 may be integral with, fixed to, and/or the same component as the sliding foot 154 discussed above, but this is not the case in the depicted embodiment.

In addition, the solenoid 176 may be movable along the second deck 106 in a direction parallel to a plane defined by the top surface 118 of the second deck 106. Since the solenoid 176 may be fixed in the horizontal direction due to the vertical nature of the track 184, such a feature may be advantageous where the second deck 106 is capable of rotating (e.g., for reasons similar to those discussed above with respect to the second horizontal support 172 with reference to FIG. 7). To provide the capability for such movement, a second track 190 may be included at an edge of the second track 190 as shown in FIG. 9. The second track 190 may have a C-shaped cross-section, as shown, with an opening 192. A sliding head 194 may be fixed to the bracket 188, and access to the sliding head 194 may be provided by the opening 192. Thus, when second deck 106 rotates, the sliding head 194 may move within and along the C-shaped second track 190 such that the solenoid 176 and its corresponding components do not interfere with deck rotation.

In some embodiments, a single control system may jointly control the actuators 144 (FIG. 4) and the solenoids 176 (FIG. 9). For example, when it is desirable to move the second deck 106 from its horizontal orientation to a ramped orientation, the control system may first send a voltage or other electrical control signal to the solenoids 176, thereby unlocking any respective latches (such that the second deck 106 is free to move in the vertical direction). After this step (or simultaneously), the control system may send an electrical signal for operating the actuators 144, which may cause the actuators 144 to raise or lower the second deck 106 depending on the desired function. Once the second deck 106 reaches a desired position or orientation, the control signal send to the solenoids 176 may be terminated, which may cause the respective latches to move into a locked position and prevent further movement of the second deck 106. Also, it is contemplated that the control system can selectively control only certain actuators or solenoids, or provide varying control, to accomplish certain functions. For example, only the rear actuators and solenoids coupled to the second deck 106 may be operated when moving the second deck 106 between a horizontal and ramped position, while rear and also front actuators and solenoids may be actuated when raising or lowering the second deck 106 while it maintains a horizontal orientation. Advantageously, these components provide a simple, efficient, and safe adjustable deck system 102 that can be operated automatically (e.g., via buttons or another input interface). Thus, loading and unloading can be accomplished with reduced man hours and increased safety relative to prior art decking systems.

Figure 11:
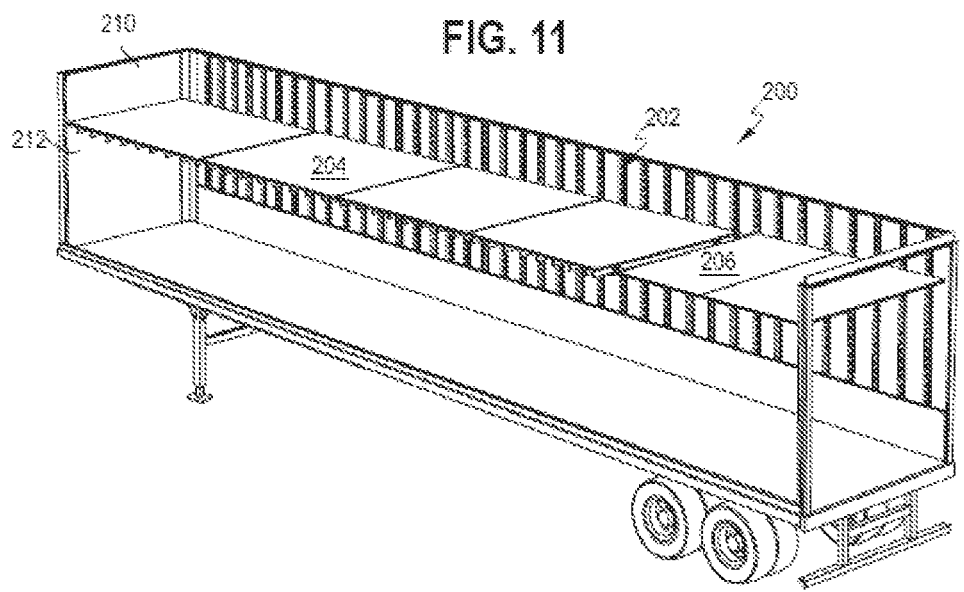
FIG. 11 is an illustration showing a cargo trailer having an adjustable deck system having a plurality of decks in accordance with certain aspects of the present disclosure.
Figure 12:
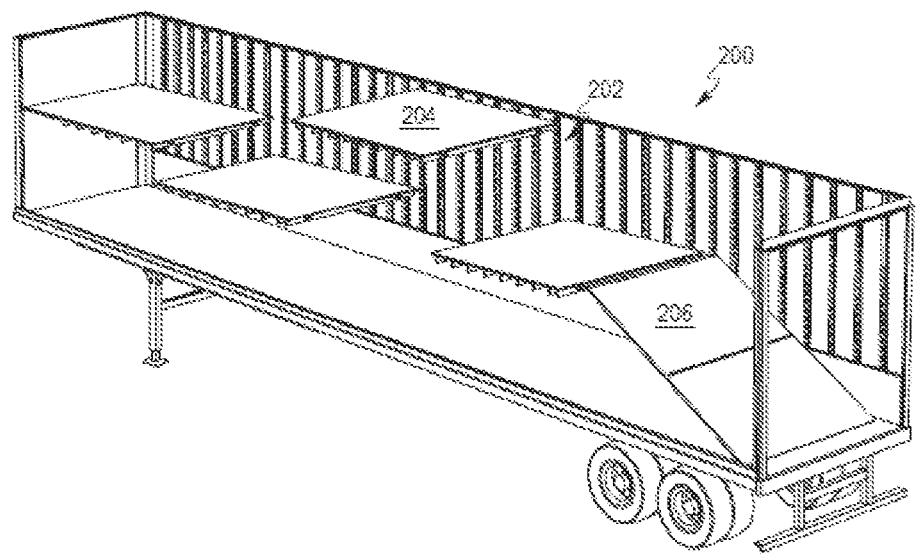
FIG. 12 is an illustration showing the cargo trailer of FIG. 11 where the decks have moved to various levels within the cargo trailer and where a ramp is formed in accordance with certain aspects of the present disclosure.

FIGS. 11-12 show another embodiment of a cargo trailer 200 having an adjustable deck system 202. The adjustable deck system 202 may have any of the compatible features discussed above with regards to the adjustable deck system 102 (FIG. 1), and vice versa. However, as shown, the adjustable deck system 202 has a primary difference from the above-discussed embodiments: the adjustable deck system 202 segments its horizontal (or ramped) decks that separate the lower sub-compartment 212 from the upper sub-compartment 210. In particular, a plurality of decks 204 are shown that are each individually operable (e.g., using the methods and devices discussed above, along with variations thereof), which allows each of the decks 204 to move up and down without necessarily requiring movement of other the decks 204. Similarly, the portion of the cargo system that forms a ramp at the rear of the cargo trailer 200 is segmented into two decks 206, which also may be individually operable.

In addition, it is contemplated that the ramp may involve more or less than the two decks 206. For example, if a relatively steep ramp is desired, one deck 206 may be used to form the ramp. If a less steep ramp is desired, two or more decks 206 (and/or decks 204) may be used to form the ramp. It is contemplated that any of the decks 204 and/or 206 may be capable of forming a portion of a ramp at any suitable location within the cargo trailer 200. Also, while the decks 204 and 206 are depicted as being different sizes, this is not required. However, it may be advantageous to optimize the size of the decks 206 and/or 204 such that the dimensions of the ramp are suitable for particular functions (e.g., appropriate for receiving a wheeled vehicle).

Figure 13:
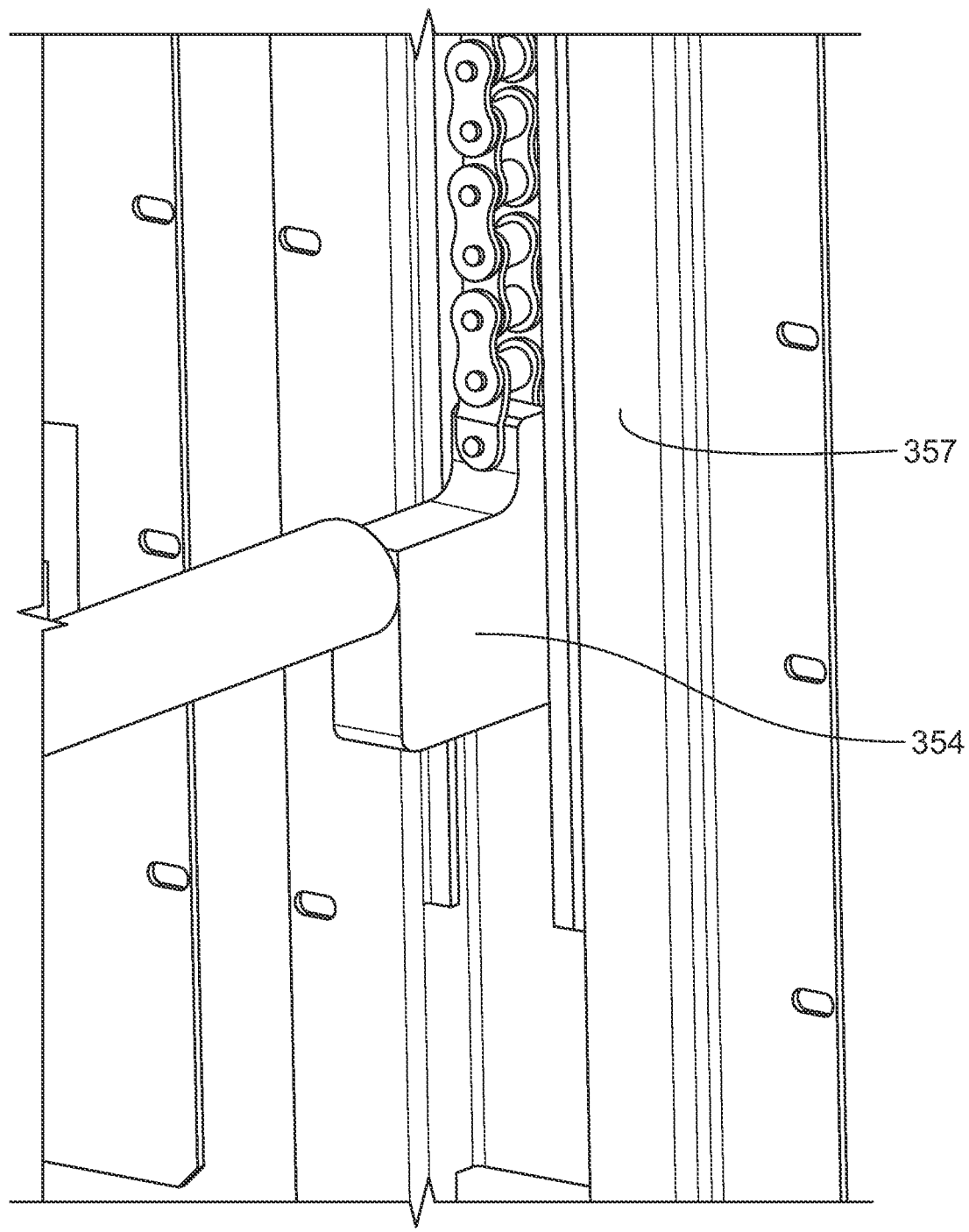
FIG. 13 is an illustration showing a foot that moves with a deck of the deck system upon actuation of the chain drive and related components in accordance with certain aspects of the present disclosure.
Figure 14:
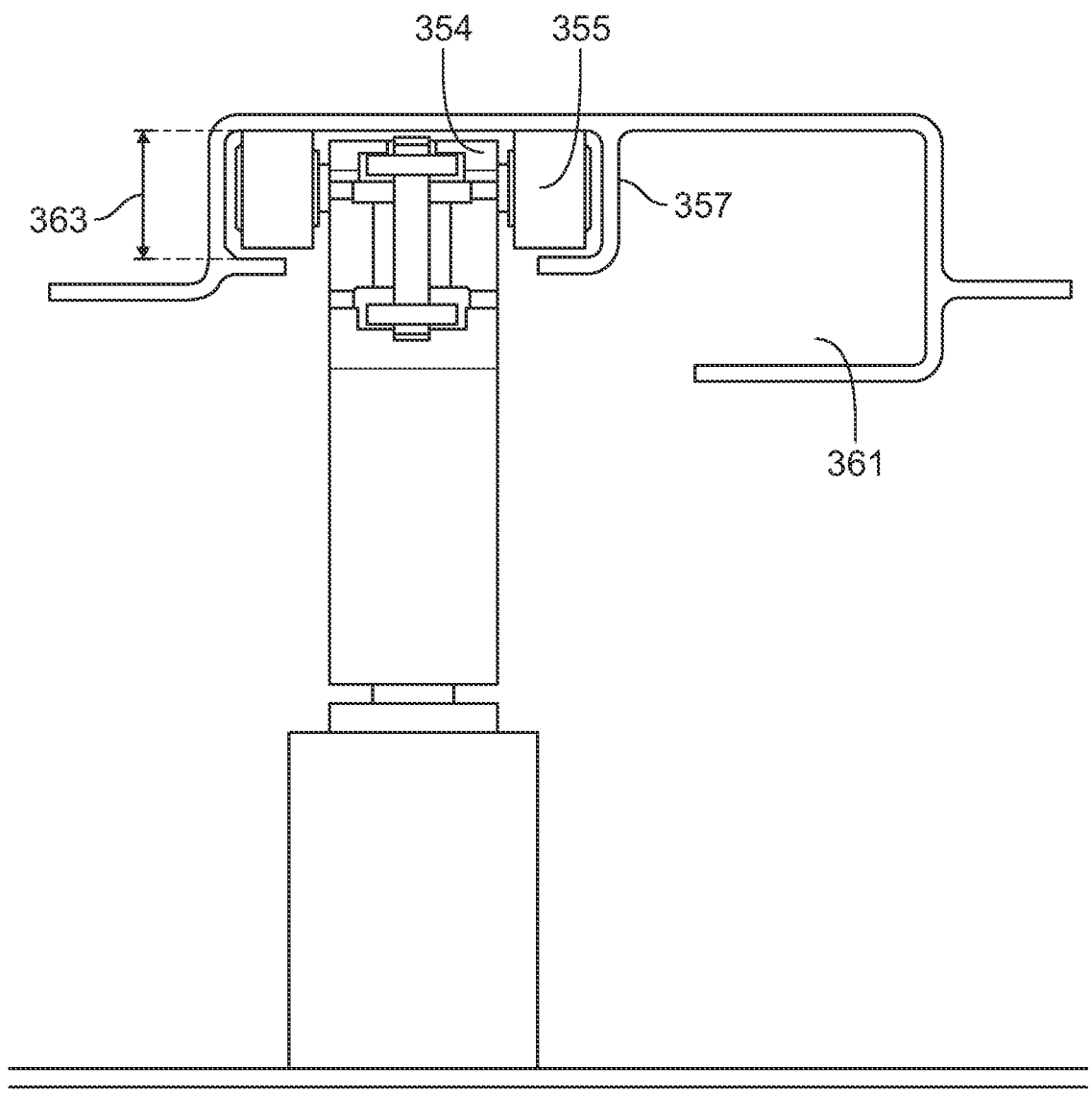
FIG. 14 is an illustration showing a top view of the foot and related components of FIG. 13, where rollers are depicted in accordance with certain aspects of the present disclosure.
Figure 15:
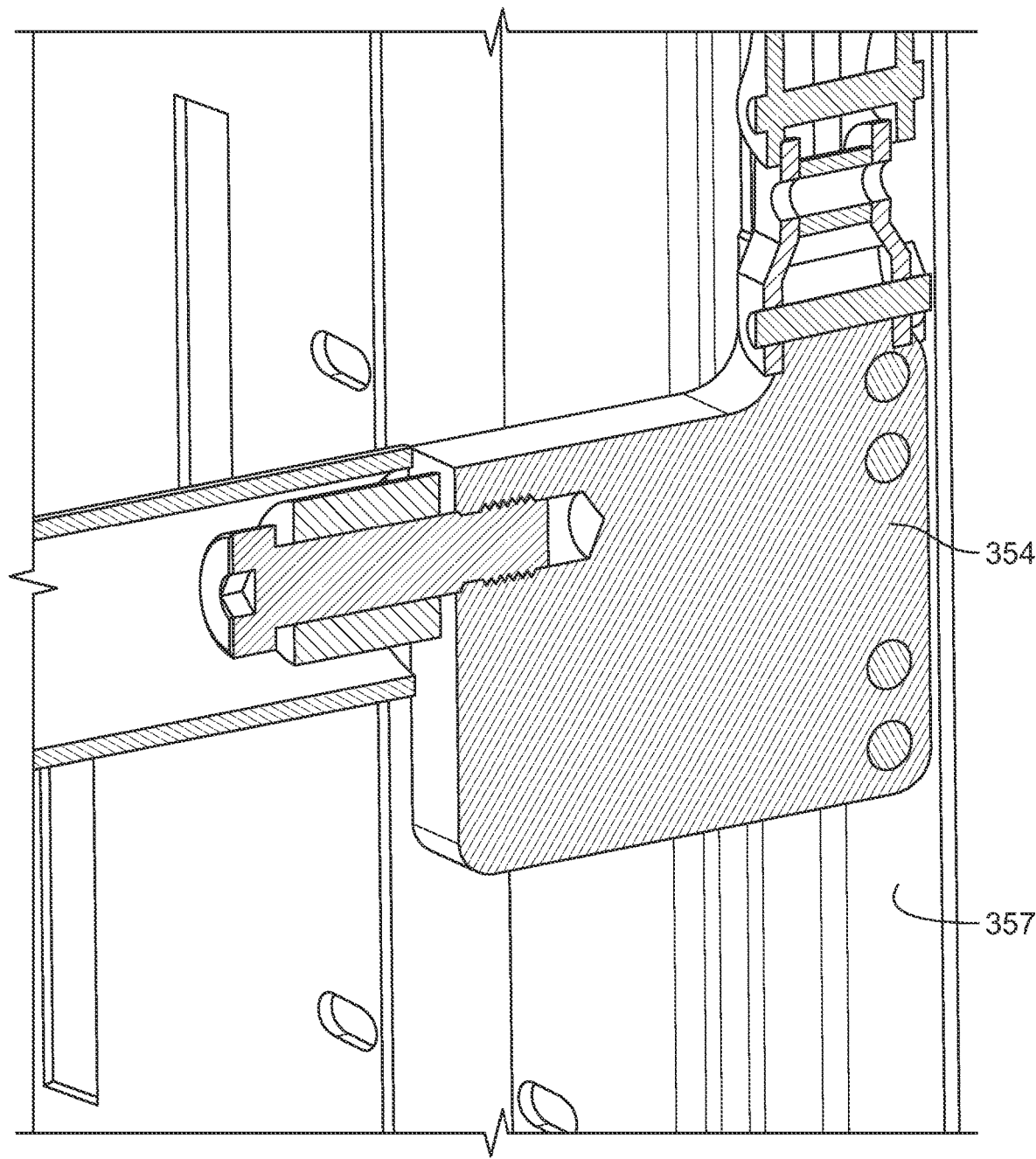
FIG. 15 is an illustration showing a section view of the foot and related components from FIGS. 13-14.

FIGS. 13-15 are illustrations showing various views of an example of a foot 354 and related components that may be used with one or more of the above-described decks (e.g., decks 204 and/or 206 of FIGS. 11-12, decks 104 and/or 106 of FIG. 1, etc.). The foot 354 may differ from certain embodiments discussed above. For example, in certain above-described embodiments, the respective feet may slide within grooves, and they may include a Delrin anti-friction material or other material having a low friction to ensure smooth movement through such grove. Additionally or alternatively, the grooves themselves may be formed of a low-friction material, and/or a lubricant may be used. This feature works well in certain applications, particularly when an associated deck is intended to move vertical only (e.g., without ramping).

In other applications (e.g., when a deck may be capable of ramping as discussed above), a roller may be desired to further enhance the movement of feet along the cargo compartment walls. For example, as shown in FIG. 13-14, a set of rollers 355 may be rotatably secured to the foot 354. The rollers 355 may each be located within a C-track 357, as shown, such that the rollers 355 may move vertically through the C-track 357 when an attached deck moves. Advantageously, the C-track 357 may have a depth 363 that is slightly larger than the diameter of the rollers 355 (e.g., to prevent jamming). Similarly, the width of the C-track 357 may be slightly larger than a width of the wheelbase of the foot 354. Optionally, a separate track compartment 361 may be included, which may house any suitable component. For example, the track compartment 361 an end of the chain 346 (e.g., when a single-leg chain drive is used, for example).

Figure 16:
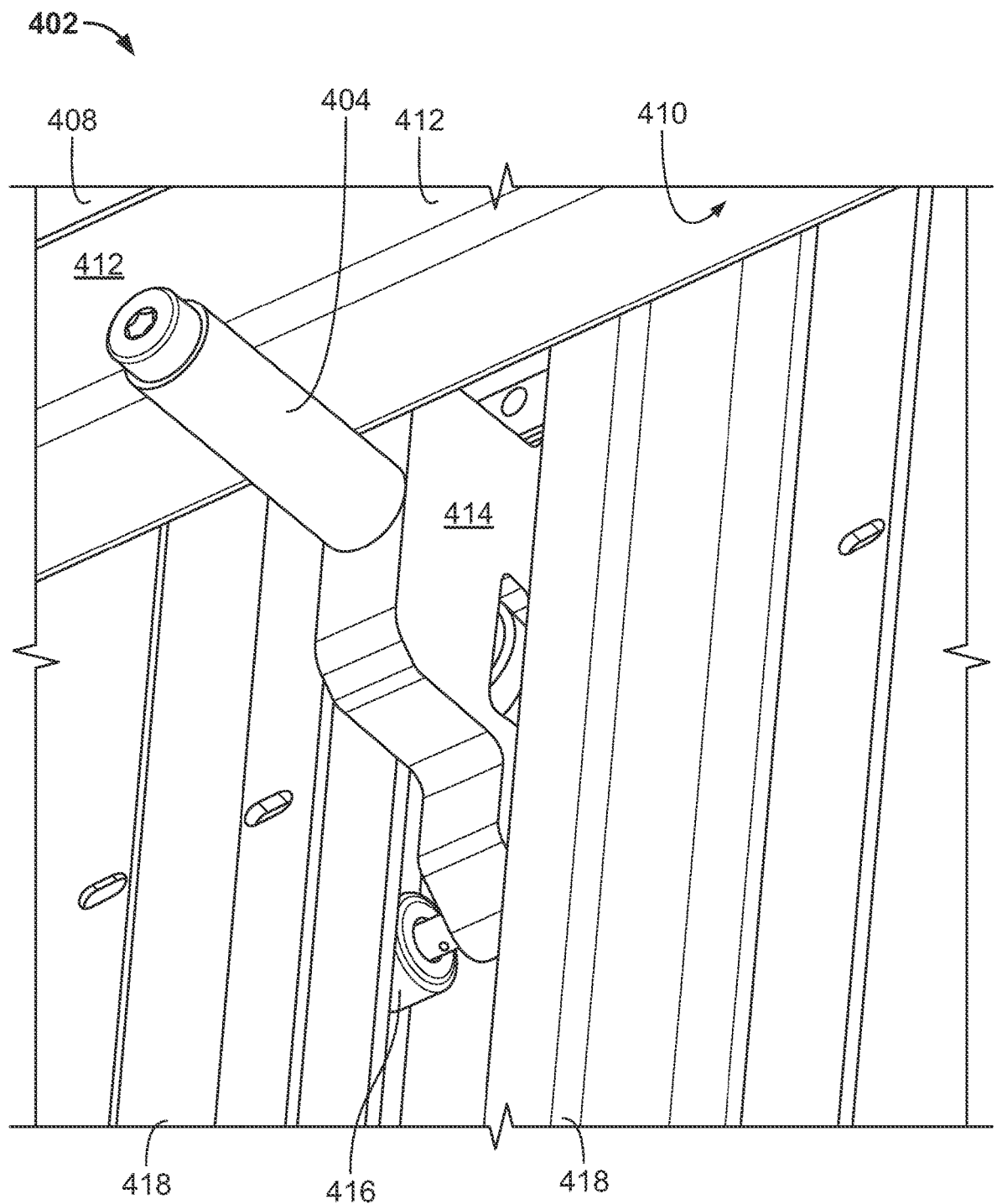
FIG. 16 is an illustration showing a rear roller for supporting a deck in accordance with certain aspects of the present disclosure.

FIGS. 16-21 show additional non-limiting examples showing alternatives to the foot embodiments and/or horizontal support embodiments discussed above. As shown in FIG. 16, a rear roller 404 is shown, which may generally support a rear portion of the deck assembly 402 (e.g., perhaps a back ramp, as discussed above). As shown, the rear roller 404 may be slidable/rollable on a bottom surface 410 of the deck 408, such that it is moveable linearly along the deck 408 to accommodate linear displacement experienced by the rear roller 404 relative to a rail 412 due to deck ramping. The rear roller 404 does not necessarily have to be at the rear of the deck assembly, and a similar or identical feature may be used at other locations (e.g., locations between the front and rear). The rear roller 404 may be secured to a foot 414, which has (in this instance) two rollers 416 slidable/rollable within the depicted channels of the C-tracks 418.

Figure 17:
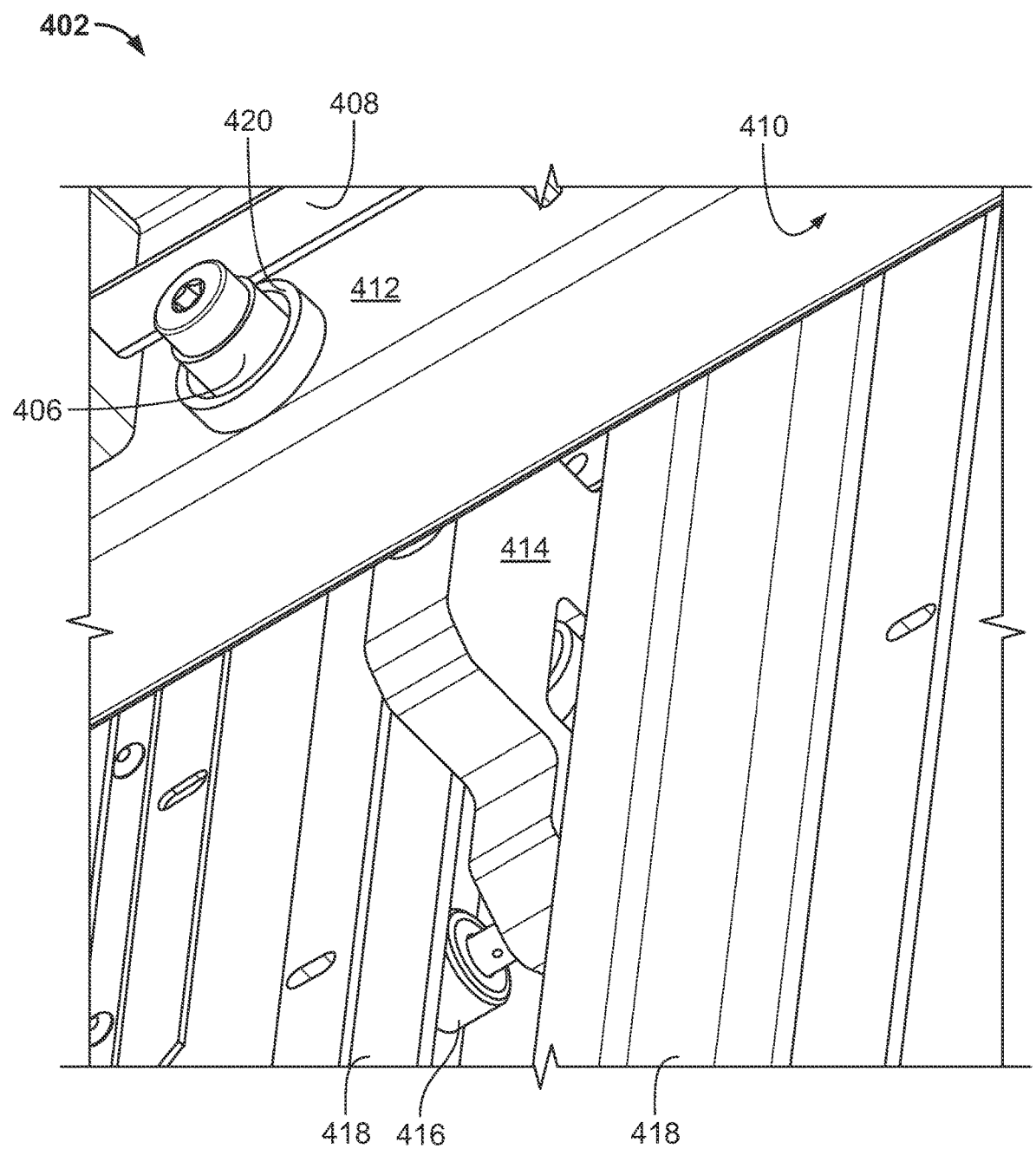
FIG. 17 is an illustration showing a front roller for supporting a deck in accordance with certain aspects of the present disclosure.

FIG. 17 shows an example of a roller that is fixed relative to the rail 412, here shown as front roller 406. The front roller 406 may be substantially surrounded by the rail 412 (e.g., extending through a cylindrical opening 420 or void of the rail 412) such that, much like first horizontal support 166 of FIG. 6, the front roller 406 is prevented from moving linearly along the rail 412 even when the deck 408 ramps. The front roller 406 of FIG. 17 includes a foot 414 similar to foot 154 depicted in FIG. 6.

Figure 18:
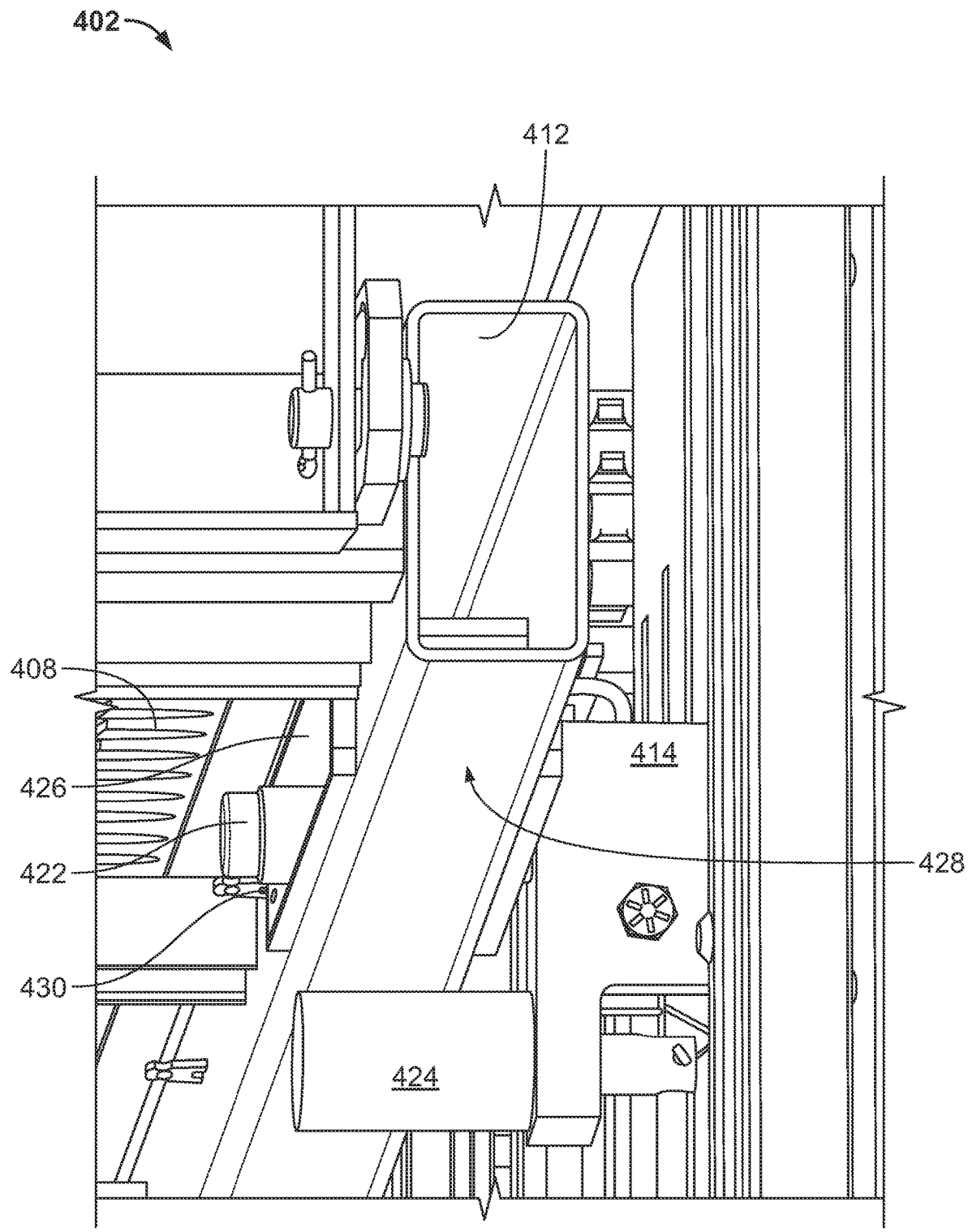
FIG. 18 is an illustration showing a foot coupled to dual horizontal supports for supporting a deck in accordance with certain aspects of the present disclosure.

FIG. 18 shows another example, where two horizontal supports, in particular an upper roller 422 and a lower roller 424, are secured to a foot 414. Notably, the rollers 422, 424 do not have to be rollers (e.g., rolling or rotating bodies) but may include any other suitable horizontal support type. In the depicted example, the upper roller 422 is located within an elongated opening 426 or void of the rail, and the lower roller 424 is moveable along the lower surface 428 of the rail 412. Such linear movement may accommodate displacement due to ramping, as discussed in detail above. Advantageously, the duel-support nature of the foot 414 and the horizontal supports (or upper and lower rollers) may provide enhanced engagement with the deck 408 since the lower roller 424 may provide enhanced support in the vertical direction and such that the upper roller 422 may generally provide a limit to the degree of ramping (i.e., since the upper roller 422 will engage the ends 430 of the opening 426 when the limits of ramping are reached).

Figure 19:
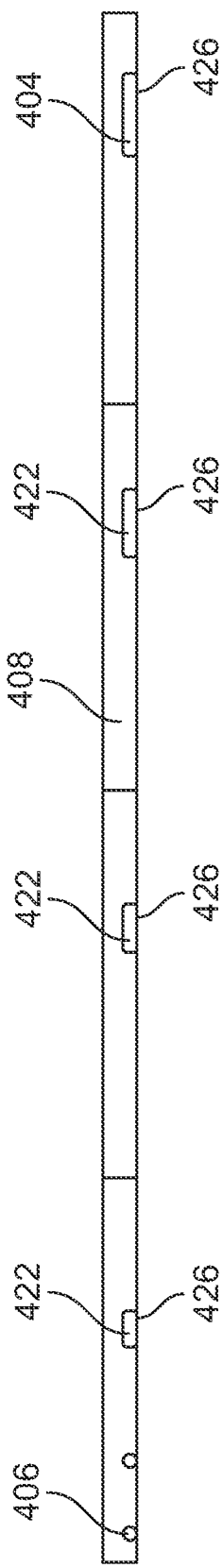
FIG. 19 is an illustration showing a side view of an additional embodiment of a deck supported by horizontal supports (e.g. rollers) in accordance with certain aspects of the present disclosure.
Figure 20:
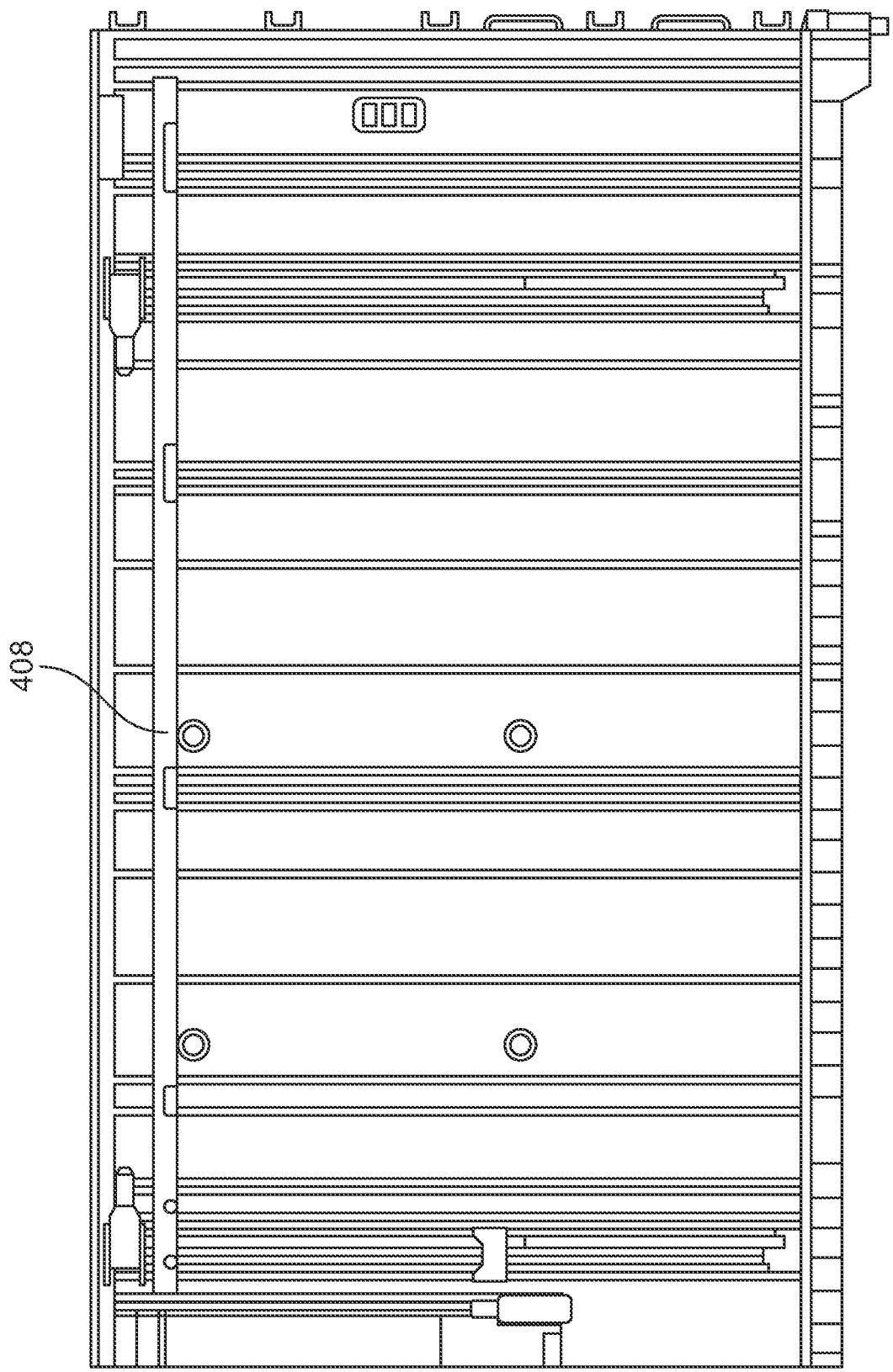
FIG. 20 and FIG. 21 are illustrations showing various states/orientations of the deck embodiment of FIG. 19 when incorporated into a trailer in accordance with certain aspects of the present disclosure.
Figure 21:
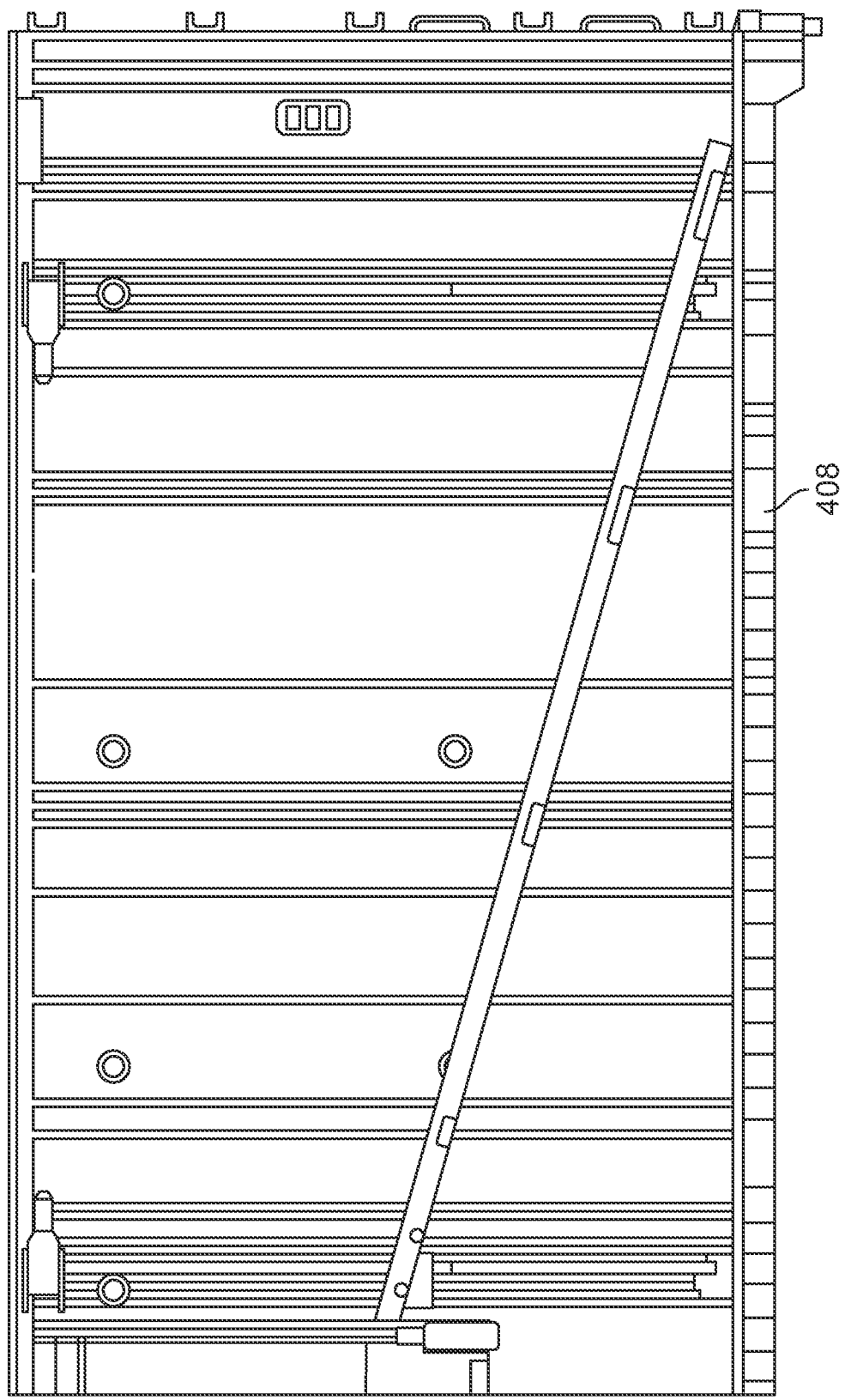

FIG. 19 shows a side view of the deck 408, where the rail 412 has openings 426 for receiving a corresponding set of the upper rollers 422 (where the lower rollers 424 may be optionally included, but are not shown). As shown, the size of the openings 426 may be selected in view of the horizontal position of such openings (e.g., increasing from front-to-rear) to appropriately address roller displacement due to ramping (similar to as described with reference to FIG. 8B above). To illustrate further, FIGS. 20-21 show the deck in horizontal and ramped orientations and the resulting positions of the rollers within the openings (e.g., similar to as described with reference to FIGS. 8A-8B).

Having described various aspects of the subject matter above, additional disclosure is provided below that may be consistent with the claims originally filed with this disclosure. A first general includes a deck system for cargo compartment, including one or more of the following: a first deck; a second deck, where at least one of the first deck and the second deck divide the cargo compartment into an upper sub-compartment and a lower sub-compartment; and an actuator that is mechanically coupled to the second deck, where operation of the actuator causes at least a portion of the second deck to move vertically relative to the first deck within the cargo compartment.

Implementations may include one or more of the following features. The deck system where a junction is located between the first deck and the second deck, and where the second deck is rotatable about a pivot point at or adjacent to the junction. The deck system where operation of the actuator causes the second deck to rotate relative to the first deck such that the second deck is movable between a horizontal orientation and a ramped orientation. The deck system where the second deck includes a horizontal state and a ramped state, and where actuation of the actuator causes movement of the second deck between the horizontal state and the ramped state. The deck system where the second deck is configured to move from the horizontal state to the ramped state while cargo is located on the second deck. The deck system where the second deck includes a first slot on a first side of the second deck, the first side being adjacent to a junction between the first deck and the second deck, and where the first slot receives a first horizontal support extending on an underside of the second deck. The deck system where the second deck includes a second slot on a second side of the second deck, the second slot receiving a second horizontal support that extends on an underside of the second deck, the second horizontal support being substantially parallel to the first horizontal support, where the second slot includes a length that is longer than a length of the first slot, and where the length of the second slot accommodates a relative displacement between the first horizontal support and the second horizontal support when the second deck moves between a horizontal state and a ramped state. The deck system where the actuator includes a chain drive and a single chain leg that extends from the chain drive to the second deck. The deck system where the actuator is coupled to a sliding foot, the sliding foot being fixed relative to the second deck in at least the vertical direction, and where the sliding foot is fixed in the horizontal direction relative to a wall of the cargo compartment. The deck system where the sliding foot is coupled to a vertical track in the wall of the cargo compartment, and where the sliding foot is coupled to a roller configured for movement within a c-track. The deck system where the sliding foot is directly connected to a first horizontal support extending on an underside of the second deck. The deck system where a solenoid is coupled to the second deck and configured to operate a latch that locks the second deck in at least the vertical direction when in a locked state. The deck system where the solenoid is coupled to a track extending along the second deck such that the solenoid is movable relative to the second deck in a direction parallel to a plane defined by a top surface of the second deck. The deck system where a plurality of first decks are included, each first deck of the plurality of first decks being independently controllable.

A second general aspect include a deck system for cargo compartment, including one or more of the following features: a deck configured to divide the cargo compartment into an upper sub-compartment and a lower sub-compartment; an actuator that is mechanically coupled to the deck, a fastening device mechanically coupled to a latch; and a control system electrically connected to each of the actuator and the fastening device, where the actuator is configured to control the fastening device and the actuator such that the deck is movable between a horizontal orientation and a ramped orientation.

Implementations may include one or more of the following features. The fastening device may include a solenoid, the solenoid being configured to move the latch between a locked position and an unlocked position. The deck system where the actuator includes a chain drive, the chain drive including at least one chain leg that controls a vertical position of the deck.

A third general aspect includes a deck for supporting cargo in a cargo compartment, including one or more of the following: a first slot, the first slot being configured to receive a first horizontal support extending on an underside of the deck; and a second slot, the second slot being configured to receive a second horizontal support extending on the underside of the deck, where the first horizontal support is substantially parallel to the second horizontal support, and where a first length of the first slot is smaller than a second length of the second slot.

Implementations may include one or more of the following features. The deck where the length of the first slot and the length of the second slot extend in a direction perpendicular to a longitudinal direction of the first horizontal support. The deck where an intervening slot is located between the first slot and the second slot, and where a length of the intervening slot is larger than the first length but smaller than the second length.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

We claim:

1. A deck system for cargo compartment, comprising:
 a first deck;
 a second deck that is adjustable between a horizontal orientation and a ramped orientation;
 the second deck comprising:
  a first end positioned closer to the first deck and an opposing second end positioned away from the first deck; and
  a support rail extending between the first end and the second end;
 a first rail support positioned near the first end, wherein the second deck pivots relative to the first rail support when moving between the horizontal configuration and the ramped configuration; and wherein the first rail support is vertically and horizontally fixed relative to the second deck;
 a second rail support positioned between the first rail support and the second end, wherein the second rail support is configured to horizontally traverse relative to the support rail when the second deck moves between the horizontal configuration and the ramped configuration; and an actuator that is mechanically coupled to the second deck, wherein operation of the actuator causes at least a portion of the second deck to move vertically relative to the first deck within the cargo compartment.

2. The deck system of claim 1, wherein a junction is located between the first deck and the second deck, and wherein the second deck is rotatable about the first rail support at or adjacent to the junction.

3. The deck system of claim 2, wherein operation of the actuator causes the second deck to rotate relative to the first deck such that the second deck is movable between a horizontal orientation and a ramped orientation.

4. The deck system of claim 1, wherein the actuator is operatively coupled to the first rail support and wherein the deck system further comprises a second actuator operatively coupled to the second rail support.

5. The deck system of claim 1, wherein the second rail support comprises a roller positioned on an underneath side of the support rail.

6. The deck system of claim 1, wherein the second deck includes a first slot on a first side of the second deck, the first side being adjacent to a junction between the first deck and the second deck, and wherein the first slot receives a first horizontal support extending on an underside of the second deck.

7. The deck system of claim 6, wherein the second deck includes a second slot on a second side of the second deck, the second slot receiving a second horizontal support that extends on an underside of the second deck, the second horizontal support being substantially parallel to the first horizontal support, wherein the second slot includes a length that is longer than a length of the first slot, and wherein the length of the second slot accommodates a relative displacement between the first horizontal support and the second horizontal support when the second deck moves between a horizontal state and a ramped state.

8. The deck system of 5, wherein the first rail support comprises a roller positioned in an opening in the support rail.

9. The deck system of claim 1, wherein the actuator is coupled to a sliding foot, the sliding foot being fixed relative to the second deck in at least the vertical direction, and wherein the sliding foot is fixed in the horizontal direction relative to a wall of the cargo compartment.

10. The deck system of claim 9, wherein the sliding foot is coupled to a vertical track that includes vertical walls spaced apart by a depth and that is coupled to the wall of the cargo compartment, and wherein the sliding foot is coupled to a roller that is retained between the vertical walls, that includes a diameter smaller than the depth, and that is configured to move relative to the vertical walls.

11. The deck system of claim 9, wherein the sliding foot is directly connected to a first horizontal support extending on an underside of the second deck.

12. The deck system of claim 11, wherein the first horizontal support is an upper roller, and wherein the sliding foot is also connected to a lower roller that extends parallel to the upper roller.

13. The deck system of claim 9 further comprising, a fastening device comprising a second actuator operatively coupled to a latch that locks the second deck in at least the vertical direction when in a locked state; and a single control system configured to control the first actuator and the second actuator.

14. The deck system of claim 13, wherein the single control system is configured to send a first signal to the actuator to affect a vertical position of the sliding foot and a second signal to the fastening device to lock or unlock the latch.

15. A deck system for cargo compartment, comprising:
a deck that is adjustable between a horizontal orientation and a ramped orientation;
the deck comprising:
a first end positioned closer to a front of the cargo compartment and an opposing second end positioned towards a rear of the cargo compartment; and
a support rail extending between the first end and the second end;
a first rail support positioned near the first end, wherein the deck pivots relative to the first rail support when moving between the horizontal configuration and the ramped configuration; and wherein the first rail support is vertically and horizontally fixed relative to the deck;
a second rail support positioned between the first rail support and the second end, wherein the second rail support is configured to horizontally traverse relative to the support rail when the deck moves between the horizontal configuration and the ramped configuration;
a first actuator that is operatively coupled to the first rail support;
a second actuator that is operatively coupled to the second rail support; and
a control system electrically connected to the first actuator and the second actuator, such that the first actuator and the second actuator are controllable independently of one another.

16. The deck system of claim 15 further comprising, a first sliding foot coupled to the first rail support and to the first actuator; and a second sliding foot coupled to the second rail support and to the second actuator.

17. The deck system of claim 16, wherein the first actuator and the second actuator each includes a chain drive, the chain drive including at least one chain leg that controls a vertical position of the deck.

18. A deck for supporting cargo in a cargo compartment, comprising:
a first slot, the first slot being configured to receive a first horizontal support extending on an underside of the deck; and
a second slot, the second slot being configured to receive a second horizontal support extending on the underside of the deck, where the first horizontal support is substantially parallel to the second horizontal support, and wherein a first length of the first slot is smaller than a second length of the second slot.

19. The deck of claim 18, wherein the length of the first slot and the length of the second slot extend in a direction perpendicular to a longitudinal direction of the first horizontal support.

20. The deck of claim 18, wherein an intervening slot is located between the first slot and the second slot, and wherein a length of the intervening slot is larger than the first length but smaller than the second length.

* * * * *

UNITED STATES PATENT AND TRADEMARK OFFICE
CERTIFICATE OF CORRECTION

PATENT NO. : 11,904,753 B2
APPLICATION NO. : 17/696026
DATED : February 20, 2024
INVENTOR(S) : Gregory Alan Kauffman, Jerome Thomas Jones and Matthew James Rommel Page 1 of 1

It is certified that error appears in the above-identified patent and that said Letters Patent is hereby corrected as shown below:

In the Claims

Column 11, Line 40, Claim 8:
In the line reading "8. The deck system of 5, wherein the first rail support" should read --8. The deck system of claim 5, wherein the first rail support--.

Signed and Sealed this
Sixteenth Day of April, 2024

*Katherine Kelly Vidal*

Katherine Kelly Vidal
*Director of the United States Patent and Trademark Office*